Oct. 20, 1925.

J. E. TIPPLE

POULTRY FEEDER

Filed Dec. 4, 1924

1,558,316

Inventor
J. E. Tipple,

Attorney

Patented Oct. 20, 1925.

1,558,316

UNITED STATES PATENT OFFICE.

JOHN E. TIPPLE, OF UNION CITY, OHIO.

POULTRY FEEDER.

Application filed December 4, 1924. Serial No. 753,941.

*To all whom it may concern:*

Be it known that JOHN E. TIPPLE, a citizen of the United States of America, residing at Union City, in the county of Darke and State of Ohio, has invented new and useful Improvements in Poultry Feeders, of which the following is a specification.

The object of the invention is to provide a simple and efficient means for supplying feed to poultry under such conditions as to protect the unused portion of the feed or the feed prior to its consumption by the fowls in proper condition against exposure to rain, etc., the feeder being particularly designed for use in supplying dry mash feed; and more particularly to provide a device of this type whereby the waste of the feed is prevented, and only a limited portion of the surface of the same is exposed for access by the poultry until the entire quantity represented by the charge of the apparatus has been consumed; and with these objects in view the invention consists in a construction and combination of parts of which a preferred embodiment is shown in the accompanying drawings, wherein:—

Figure 1:
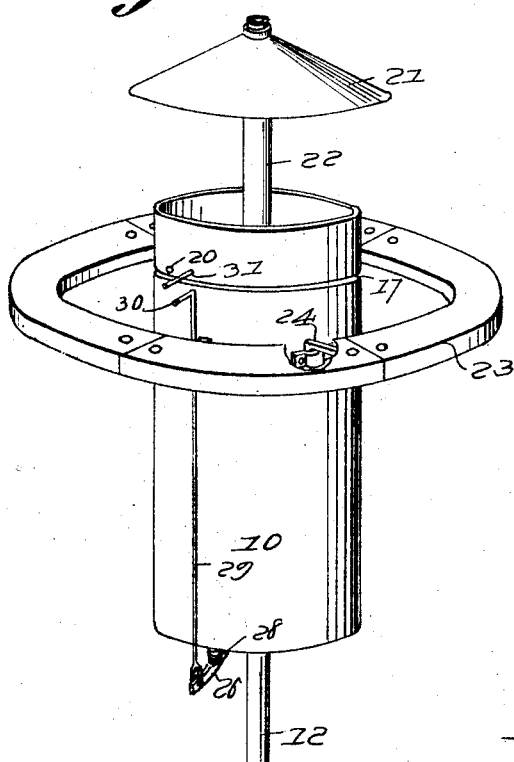
Figure 1 is a perspective view of a feeder embodying the invention.
Figure 2:
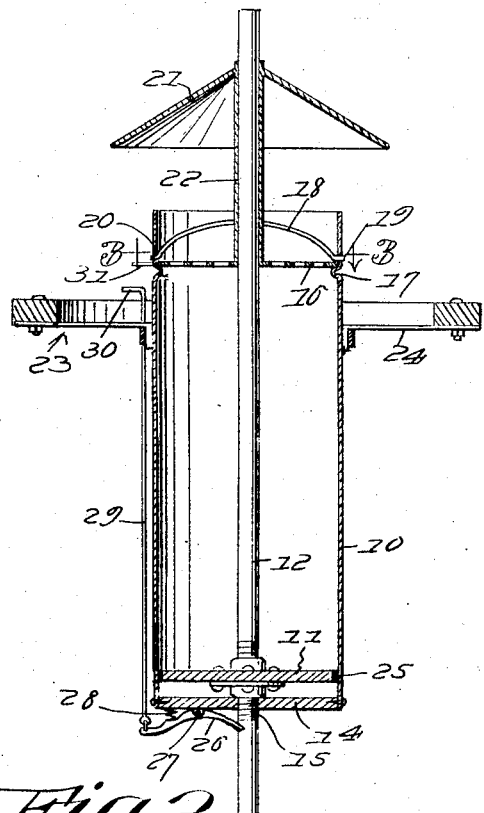
Figure 2 is a vertical sectional view of the same.
Figure 3:
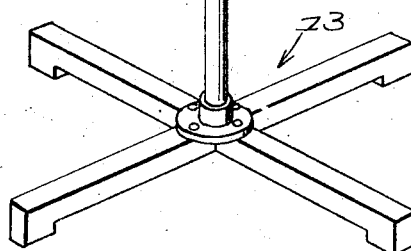
Figure 3 is a horizontal section on the plane indicated by the line 3—3 of Figure 2.
Figure 3:
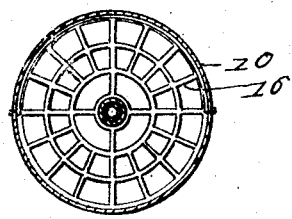

The apparatus consists essentially of an upright reservoir 10 which in the construction illustrated and preferably for some reasons is of cylindrical form, with the bottom 11 of the feed containing chamber represented by a follower which is movable relative to the walls of the reservoir or with relation to which said receptacle is movable, as the contents of the feed chamber are consumed, the follower being carried by a central rod 12 provided with a suitable base 13, and the cylindrical wall of the reservoir or receptacle having at its lower edge a guide disk 14 or its equivalent provided with a central opening 15 for sliding contact with the portion of the upright 12 below the plane of the bottom or follower 11.

Located in the reservoir or receptacle near its upper edge, and preferably removable therefrom to facilitate cleaning the interior of the receptacle is a stop disk 16 consisting of a grating fitted at its periphery upon an annular seat 17 within the receptacle wall and formed in the construction illustrated of an inwardly directed bead thereof. Said stop disk is preferably locked in place to guard against the possibility of displacement by upward pressure of the contents of the receptacle thereon by means of a spring rod 18 of which the outwardly directed terminals 19 fit in suitable openings 20 in the walk of the receptacle. This retaining means may be swung into place after the grating constituting the stop disk has been positioned. Also supported by the stop disk, or otherwise in convenient relation to the receptacle and under such conditions as to follow the vertical movements of the receptacle, is a hood or weather shield 21 which in the construction illustrated is supported by a tube 22 fitted upon the guide rod 12 and extending upward from the stop disk.

The reservoir or receptacle carries a perch 23 designed to be occupied by the fowl feeding from the upper end of the reservoir where the mash or like feed is accessible through the openings in the grating constituting the stop disk, and as shown the perch is of annular form supported by radial bracket arms 24, so that the weight of the fowl in feeding serves to impel the reservoir or receptacle downward and thus by the action of the follower bottom 11 force the feed upward and hold it in snug contact at its upper surface with the stop disk so that it may be readily fed through the grating to supply the poultry. Obviously as soon as weight is removed from the perch, as when the fowls are not feeding, the tendency to feed the material through the grating is discontinued and the access of water due to rain is prevented by the protecting hood which also serves to exclude the direct rays of the sun, while the limited exposure of the feed through the grating prevents the rapid drying thereof.

The periphery of the follower 11 is preferably provided with packing means such as a felt strip 25 to prevent the feed from passing downward beyond the plane thereof, and when it is desired to lock the parts against feeding movement they may be secured by a catch 26 consisting of a dog pivoted as at 27 and actuated by a spring 28 to engage the rod or stem 12, said pawl or dog being mounted upon the head 14 constituting the lower end of the reservoir or receptacle. Extending from the outer end of the dog or pawl is an operating rod or wire 29 having at its upper end a finger 30 for engagement with the retaining pin 31 to secure the dog in its inoperative position and this permit of the downward feeding movement of the reservoir or receptacle with relation to the follower.

Having described the invention, what is claimed as new and useful is:—

1. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower.

2. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower and consisting of a grated stop disk fitted within the reservoir or receptacle to limit the upward movement of the feed in the feed chamber.

3. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower and consisting of a grated stop disk removably seated in the reservoir or receptacle near its upper edge, and means for securing said disk in its seated position.

4. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower and consisting of a grated stop disk removably seated in the reservoir or receptacle near its upper edge, and a spring retaining member for locking the disk in its seated position.

5. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower and consisting of a grated stop disk fitted in the reservoir or receptacle near its upper edge, and a protecting hood carried by said disk.

6. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower and consisting of a grated stop disk fitted in the reservoir or receptacle near its upper edge, and a protecting hood having a supporting sleeve terminally seated upon said disk.

7. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower, the follower being carried by an upright rod or stem carried by said perch.

8. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower, the follower being carried by an upright rod or stem carried by said perch and said means for limiting upward movement of the feed consisting of a grated disk fitted in the upper end of the reservoir or receptacle and engaged with said rod or stem.

9. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower, the follower being carried by an upright rod or stem carried by said perch and said means for limiting upward movement of the feed consisting of a grated disk fitted in the upper end of the reservoir or receptacle and engaged with said rod or stem, and a hood having a sleeve fitted upon said rod or stem and terminally bearing upon the said disk.

10. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower, the follower being carried by a stationary rod or stem carried by said perch, and means mounted upon the reservoir or receptacle for engaging the rod or stem to lock the former against downward movement.

11. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower, the follower being carried by a stationary rod or stem carried by said perch, and means mounted upon the reservoir or receptacle for engaging the rod or stem to lock the former against downward movement and consisting of a pawl and means for securing the same in its disengaged position.

12. A poultry feeder having a reservoir or receptacle carrying a poultry perch, a stationary follower fitted in the reservoir or receptacle and forming the bottom of the feed chamber thereof, the reservoir or receptacle being movable vertically with relation to the follower, and means for controlling the movement of the reservoir or receptacle with relation to the follower, the follower being carried by a stationary rod or stem carried by said perch, and means mounted upon the reservoir or receptacle for engaging the rod or stem to lock the former against downward movement and consisting of a spring actuated pawl, an operating rod connected therewith, and a retaining pin for engagement by a finger of the operating rod to secure the pawl in its disengaged position.

In testimony whereof he affixes his signature.

JOHN E. TIPPLE.